(12) United States Patent
Ohlgren et al.

(10) Patent No.: US 7,778,822 B2
(45) Date of Patent: Aug. 17, 2010

(54) ALLOCATING AUDIO PROCESSING AMONG A PLURALITY OF PROCESSING UNITS WITH A GLOBAL SYNCHRONIZATION PULSE

(75) Inventors: Harry Carl Håkan Ohlgren, Haninge (SE); Carl Tobias Lindquist, Sundbyberg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 970 days.

(21) Appl. No.: 11/549,440

(22) Filed: Oct. 13, 2006

(65) Prior Publication Data

US 2007/0271569 A1    Nov. 22, 2007

Related U.S. Application Data

(60) Provisional application No. 60/747,719, filed on May 19, 2006.

(51) Int. Cl.
*G10L 21/00* (2006.01)
*G06F 15/80* (2006.01)
*G06F 9/50* (2006.01)
*G06F 9/52* (2006.01)

(52) U.S. Cl. ............... 704/200; 704/211; 712/28; 712/32; 713/375; 718/104

(58) Field of Classification Search ......... 704/211, 704/212, 500, 502, 503, 200; 712/28, 32; 718/102, 103, 104, 105; 713/375
See application file for complete search history.

(56) References Cited

U.S. PATENT DOCUMENTS

| | | | | |
|---|---|---|---|---|
| 5,289,577 A | * | 2/1994 | Gonzales et al. | 345/506 |
| 5,325,525 A | * | 6/1994 | Shan et al. | 718/104 |
| 6,009,507 A | * | 12/1999 | Brooks et al. | 712/28 |
| 6,021,457 A | * | 2/2000 | Archer et al. | 710/260 |
| 6,298,370 B1 | | 10/2001 | Tang et al. | |
| 6,301,603 B1 | | 10/2001 | Maher et al. | |
| 6,535,926 B1 | * | 3/2003 | Esker | 709/248 |
| 6,560,700 B1 | * | 5/2003 | Birkler et al. | 713/1 |
| 6,751,706 B2 | * | 6/2004 | Chauvel et al. | 711/122 |
| 6,763,519 B1 | * | 7/2004 | McColl et al. | 718/100 |
| 7,127,701 B2 | * | 10/2006 | Fables et al. | 717/104 |
| 7,325,148 B2 | * | 1/2008 | Inoue et al. | 713/300 |
| 7,356,618 B2 | * | 4/2008 | Lienhart et al. | 709/248 |
| 7,412,621 B2 | * | 8/2008 | Choi | 714/10 |
| 7,434,029 B2 | * | 10/2008 | Chauvel et al. | 712/205 |
| 7,437,521 B1 | * | 10/2008 | Scott et al. | 711/151 |
| 7,450,959 B2 | * | 11/2008 | Lin et al. | 455/550.1 |

(Continued)

FOREIGN PATENT DOCUMENTS

GB    2 386 442    9/2003

*Primary Examiner*—Martin Lerner
(74) *Attorney, Agent, or Firm*—Harrity & Harrity, LLP (57) ABSTRACT

Resources may be dynamically allocated in a distributed processing portable electronic communication device. The dynamic allocation may include receiving an instruction to process an audio processing task related to audio data; determining whether resources for processing the processing task are available at a first processing unit; performing the audio processing task by the first processing unit when the resources are determined to be available, the audio processing task obtaining processed audio data; and providing the processed audio data synchronously with a global synchronization pulse so that the phase of the audio data is controlled.

15 Claims, 3 Drawing Sheets

U.S. PATENT DOCUMENTS 7,610,200 B2 * 10/2009 Lin .......................... 704/258
2002/0073282 A1 * 6/2002 Chauvel et al. ............. 711/122
2006/0155543 A1 * 7/2006 Cooper ...................... 704/261
2006/0256854 A1 * 11/2006 Jiang ..................... 375/240.03

* cited by examiner

ALLOCATING AUDIO PROCESSING AMONG A PLURALITY OF PROCESSING UNITS WITH A GLOBAL SYNCHRONIZATION PULSE

RELATED APPLICATIONS

This application claims priority from U.S. Provisional Application Ser. No. 60/747,719, filed May 19, 2006, entitled "DISTRIBUTED AUDIO PROCESSING," the contents of which are incorporated by reference.

TECHNICAL FIELD OF THE INVENTION

The present invention relates in general to audio processing in portable electronic communication devices, and in particular to techniques of distributed audio processing in a portable electronic communication device.

DESCRIPTION OF RELATED ART

Audio processing in multi CPU systems such as mobile phones is commonly performed by collecting all processing tasks in one digital signal processor (DSP), central processing unit (CPU) or hardware (HW) accelerator block. For historical reasons audio processing has been done by a base band processor that is responsible for voice coding of the radio bearer for mobile phones.

By collecting all processing tasks in one processing unit, there is a risk that some processing tasks can not be processed within a certain time period, thereby incurring audio processing delays. Delays in audio processing are critical since the human ear is a sensitive detector for delays and especially varying delays.

For instance, if a single processor performing the processing is fully occupied by a processing job such as processing an mp3 file, any second processing task has to wait until the first process has been completed, since the single processor was fully occupied. If a third processing task is received while the single processor is still occupied by the first processing job, both the second as well as the third processing task will be set on hold until the processor becomes idle and can receive further processing tasks.

In case the first processor is not fully occupied in processing the first processing task, time sharing may be used to make processing resources available to process the first processing task and a second processing task simultaneously.

Congestion of processing tasks awaiting processing by the single processing unit can hence occur if the resources are not sufficient for a second processing task. This is obviously a drawback of this technique for implementing audio processing.

However, many wireless consumer devices of today utilize multiple processors in order to optimize the processing of processing tasks. Different ones of the multiple processors may be specialized for certain processing tasks. The specialized processors may exhibit high performance levels with respect to certain processing tasks.

For instance, by using a communication CPU for network access and an application CPU to run user interface and applications, the processing of tasks can be optimized.

However, by using more than one processing unit a duplication of certain circuits available in both processing units are provided. Examples of such circuits that may be needed are audio circuits, electronic components, and encoder/decoders, which typically are provided for each processing unit.

However by using two processing units, both of which are arranged to process specific tasks, congestion of processing tasks for at least one of the processing units may still occur in the situation in which the resources that are provided or can be allocated by said processing unit is not sufficient for multiple processing tasks to be processed simultaneously by time sharing.

When using dual processing units that are arranged to perform a specific task, the flow of processing is predetermined. In case audio data is required to be processed by processing unit A and processing unit B, the flow will always be from one to the other for instance from A to B. In case A or B is not needed, the processing will be performed at either B or A, respectively.

Although these processing units are connected to each other sequentially, each one of them typically has to allocate resources on its own.

By using dual processors as compared with using a single processor, the performance at a reasonable load at which resources are sufficient for specific processing tasks, can thus be increased. At a high load at which at least one of the two processors is fully occupied or at least can not allocate sufficient resources to process a second processing task, the performance, however, rapidly deteriorates.

Moreover, since it is preferable to save space in mobile phones, it is not efficient to duplicate resources mobile phones, which typically is the case when using dual processing units.

From full sized computer it is known to perform tasks by using multiple processors. Tasks may here be divided in several sub tasks, where each processor typically receives one sub task to process.

It is also known to perform analog processing such as mixing of audio streams. This approach has the disadvantage that post processing of different audio components that resulted in the mixed stream is made impossible since the different audio components have already entered the analog domain.

It is therefore desirable to be able to use, in a portable electronic device, two or more specialized processing units without having congestion associated with the two or more processing units.

SUMMARY OF THE INVENTION

The invention is thus directed towards providing processing of audio processing tasks in a multiprocessor system by which congestion of processing tasks can be significantly reduced.

This is achieved by providing dynamic allocation of resources in connection with distributed processing using multiple processing units. Dynamic allocation of resources for distributed audio processing in a multiprocessor environment in a portable electronic communication device may be achieved.

According to a first aspect, a method dynamically allocates processing in a portable electronic communication device having a plurality of processing units. The method comprises receiving an instruction to process an audio processing task related to audio data; determining whether resources for processing the processing task are available at a first processing unit of the plurality of processing units; performing the audio processing task by the first processing unit when the resources are determined to be available, the audio processing task obtaining processed audio data; and providing the processed audio data synchronously with a global synchronization pulse so that the phase of the audio data is controlled.

A second aspect is directed towards the method and wherein receiving the instruction includes receiving an instruction to process an audio processing task related to a first audio stream, and wherein providing the processed audio data includes providing a processed version of the first audio stream synchronously to the global synchronization pulse so that the phase of the first audio stream is controlled.

A third aspect is directed towards the method wherein performing the audio processing task includes processing the first audio stream in relation to a second audio stream, and wherein providing the processed audio data includes providing the result of the processed first audio stream in relation to the second audio stream synchronously with the global synchronization pulse so that the relative phase of the first and second audio streams is unchanged.

A fourth aspect is directed to the method wherein the determination of whether resources to process the processing task are available is preceded by selecting the first processing unit.

A fifth aspect is directed to the method and further includes requesting the first processing unit to process the audio processing task.

A sixth aspect is directed towards the method wherein performing the audio processing task by the first processing unit includes allocating resources for processing the processing task at the first processing unit.

A seventh aspect is directed towards the method and further includes processing the processing task by one of the other processing units if the first processing unit can not allocate resources to process the audio processing task.

An eight aspect is directed towards the method wherein the performing the processing task by another one of the plurality of processing units is preceded by determining whether the another one of the plurality of processing units has available resources for processing the processing task.

A ninth aspect is directed towards the method wherein the another one of the plurality of processing units is selected for determining whether the another one of the plurality of processing units has available resources based on a schedule.

A tenth aspect is directed towards the method and further includes requesting the another one of the plurality of processing units to process the audio processing task.

An eleventh aspect is directed towards the method wherein performing the processing task by another one of the plurality of processing units is performed in dependence of the resources that can be allocated.

A twelfth aspect is directed towards the method and further includes selecting the first processing unit of the plurality of processing units according to a predetermined schedule.

A thirteenth aspect is directed towards the method and wherein the predetermined schedule includes a priority list according to which the processing unit is selected.

Additionally, a portable electronic communication device is described for dynamic allocation of resources in distributed audio processing in a multiprocessor environment.

According to a fourteenth aspect, a portable electronic communication device for dynamically allocating resources includes a first processing unit; at least one other processing; an inter-processing unit communication bus to couple the first processing unit and the at least one other processing unit; a multi-channel audio bus for carrying audio data between the first and the at least one other processing unit; and a control unit for providing a global synchronization pulse to at least the first processing unit, determining, over the inter-processing unit communication bus, whether resources to process a processing task are available at the first processing unit, controlling performance of the audio processing task by the first processing unit when the resources are determined to be available, and controlling providing processed audio data synchronously to with the global synchronization pulse to control the phase of the audio data.

A fifteenth aspect is directed to the portable electronic communication device wherein the portable communication device is a mobile phone.

A sixteenth aspect is directed to a computer program product comprising a computer readable medium having computer readable code thereon, the computer readable code, when loaded in a computer or portable electronic communication device, causing the computer or portable electronic device to: receive an instruction to process an audio processing task related to audio data; determine whether resources for processing the processing task are available at a first processing unit of the plurality of processing units; perform the audio processing task by the first processing unit when the resources are determined to be available, the audio processing task obtaining processed audio data; and provide the processed audio data synchronously with a global synchronization pulse so that the phase of the audio data is controlled.

A number of advantages are described herein. A reduction of production costs is possible by the sharing of audio components within the audio subsystem being shared by multiple processing units. Also, improved processing performance can be achieved by selection of processors being optimized for certain audio processing tasks. Additionally, improved electric power management efficiency is possible due to the possibility of selecting processing units having a suitable current consumption, with respect to the available battery power.

Additionally, since centralization of resources enables certain DSPs to be shut down when the number of processing tasks is low, that is when the processing load is low, battery power can be saved, which is clearly beneficial.

Additionally, flexibility is provided to select a processing unit being able to process an audio task. For peripheral units connected to portable electronic communication devices, the accessibility may be increased since the processing unit to process the audio data may be selected among a larger number of processing units, as compared with the case having a specific audio processing unit.

It is also a potential advantage that the capacity to process simultaneous tasks increases by using a larger number of processing units applying dynamic allocation of resources.

Another potential advantageous property of the concepts described herein is that congestion can be avoided for processing tasks that are given a high priority, since other processing units may be selected for other processing tasks or alternatively that the prioritized processing task can be moved to another processing unit which for certain can allocate resources for processing of the processing task. This is not a merit of using several processing units only but of using dynamic allocation of resources in connection with using several processing units.

It should be emphasized that the term "comprises/comprising" when used in this specification is taken to specify the presence of stated features, integers or steps, but does not preclude the presence or addition of one or more other features or steps.

BRIEF DESCRIPTION OF THE DRAWINGS

The present invention will now be described in more detail in relation to the enclosed drawings, in which.

DETAILED DESCRIPTION OF THE EMBODIMENTS

Concepts described herein are thus directed towards providing processing of audio processing tasks in a multiprocessor system by which congestion of processing tasks is significantly reduced. In general, as described herein, a processing unit that can be allocated resources is dynamically determined such that audio data to be processed can be synchronized with a global synchronization pulse.

A global synchronization pulse may be extracted from a radio network. The global synchronization pulse may be used to process, using time sharing techniques, various audio streams such that the relative phase of the various audio streams will remained unchanged.

In some implementations, the global synchronization pulse, instead of being extracted from a radio network, may be generated internally.

Figure 1:
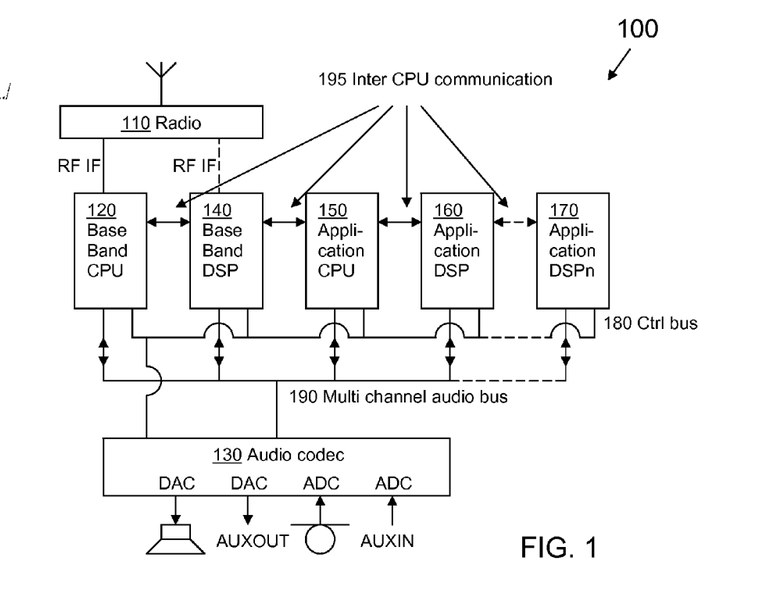
FIG. 1 shows a block diagram of distributed audio processing according to one example of the present invention

FIG. 1 is a block diagram of distributed audio processing in one example of multi-processor environment 100.

According to this example, a modulated audio file is received, on a certain radio frequency, by the receiver of the radio 110. Via a radio frequency interface (RF IF) the modulated audio file is forwarded to the base band CPU 120 which is arranged to demodulate the received modulated audio file. The base band CPU 120 can thus demodulate the received audio file into a demodulated audio file. Examples of such demodulated audio files are mp3 files, wav-files, wma-files and ogg-files. Of course, the received audio file may be formatted in a file format other than the ones mentioned above.

As the demodulated audio file is formatted into an audio file format, this is processed to convert the data into, for instance, pulse code modulation (PCM) data such that the PCM modulated audio data can be sent to the shared audio subsystem in the form of the audio codec 130.

The processors 120, 140, 150, 160, 170 shown in FIG. 1 are typically connected to each other by several buses 180, 190, of which the control bus (Ctrl bus) 180 is one example. The control bus 180 is a multi master bus, such as an inter integrated circuit bus (I²C) or a serial low-power interconnect for media bus (SLIM bus). The control bus 180 can be used to set up resources such as ADC or DAC resources, the setting of gain, the usage of filters, loudspeakers, microphones etc. in the audio codec 130. The audio codec 130 typically comprise all the DAC's, ADC's and audio amplifiers.

This control bus 180 may therefore be considered to control the interfaces between the portable electronic communication device and a user using said device.

The processing units 120, 140, 150, 160, 170 shown in FIG. 1 (i.e., Base Band CPU 120, Base Band DSP 140, Application CPU 150, Application DSP 160, and Application DSPn 170) are moreover connected to each other by a multi-channel audio bus 190. This multi-channel audio bus 190 supports a master-slave configuration as well as a multi master-multi slave configuration. It may be implemented in various ways of which multi protocol PCM and the SLIM bus are two examples. The topology of this multi-channel audio bus 190 can be a ring or a star.

This bus 190 can be used to communicate audio data in the form of audio streams from a source to a sink, that is from where the data is provided to the destination of the audio data after the data have been processed. Each source and each sink has its own address for this matter.

According to one embodiment of the present invention this multi-channel bus 190 is controlled by the control bus 180.

The processing units 120, 140, 150, 160, 170 may furthermore be connected by an inter-CPU communication bus 195, which thus connects the different CPU's and the DSP's in the processor environment 100.

The inter-CPU communication bus 195 may be used for the processing units 120, 140, 150, 160, 170 to communicate in order to determine which processor 120, 140, 150, 160, 170 is selected for processing of the audio file. It is obviously preferred that the processor 120, 140, 150, 160, 170 is idle and that the processor 120, 140, 150, 160, 170 is suited for the processing task. In this way, the resource allocation can be dynamic.

Requests to allocate resources may also be communicated over this bus 195. The sources and sinks can be allocated in runtime depending on the system load.

This inter-CPU communication bus 195 may also be used to transfer processed audio data between the different CPU's and DSP's in the multi processor environment 100. By using this inter-CPU communication bus 195, pointers to certain locations in a memory and processing commands may be communicated. However, audio data files can also be transferred by using this bus 195.

For example, consider the situation in which a DSP produces audio data in the form of a ring tone. Having produced the tone this audio data can be transferred to another processor or DSP on the inter-CPU communication bus 195. The processor receiving the ring tone may then use the tone in another application, for instance.

The inter-CPU communication bus 195 may be a logical bus and may be implemented in various ways.

It should be pointed out that some of the processors 120, 140, 150, 160, 170 may have an internal memory, whereas other can have a shared memory.

Hence, the inter-CPU communication bus 195 can be used to transfer both pointers to locations in a memory as well as to transfer audio data as such between the processing units 120, 140, 150, 160, 170.

The implementation or partition of various processing units 120, 140, 150, 160, 170 can vary. In one implementation one CPU and two DSP's share a first memory and the remaining CPU and DSP share a second memory unit.

Within such a partition it would be difficult to transfer audio data from one DSP that is associated with the first memory, to another DSP that is associated with the second memory, for the reason that they do not share the same memory. One solution to this problem is hence to send audio data over the inter-CPU communication bus 195, which can be used even though the processors 120, 140, 150, 160, 170 do not share the same memory unit.

This enables performing distributed audio processing even if the different processors 120, 140, 150, 160, 170 do not share the same memory unit in which the audio data to be processed is stored.

Figure 2:
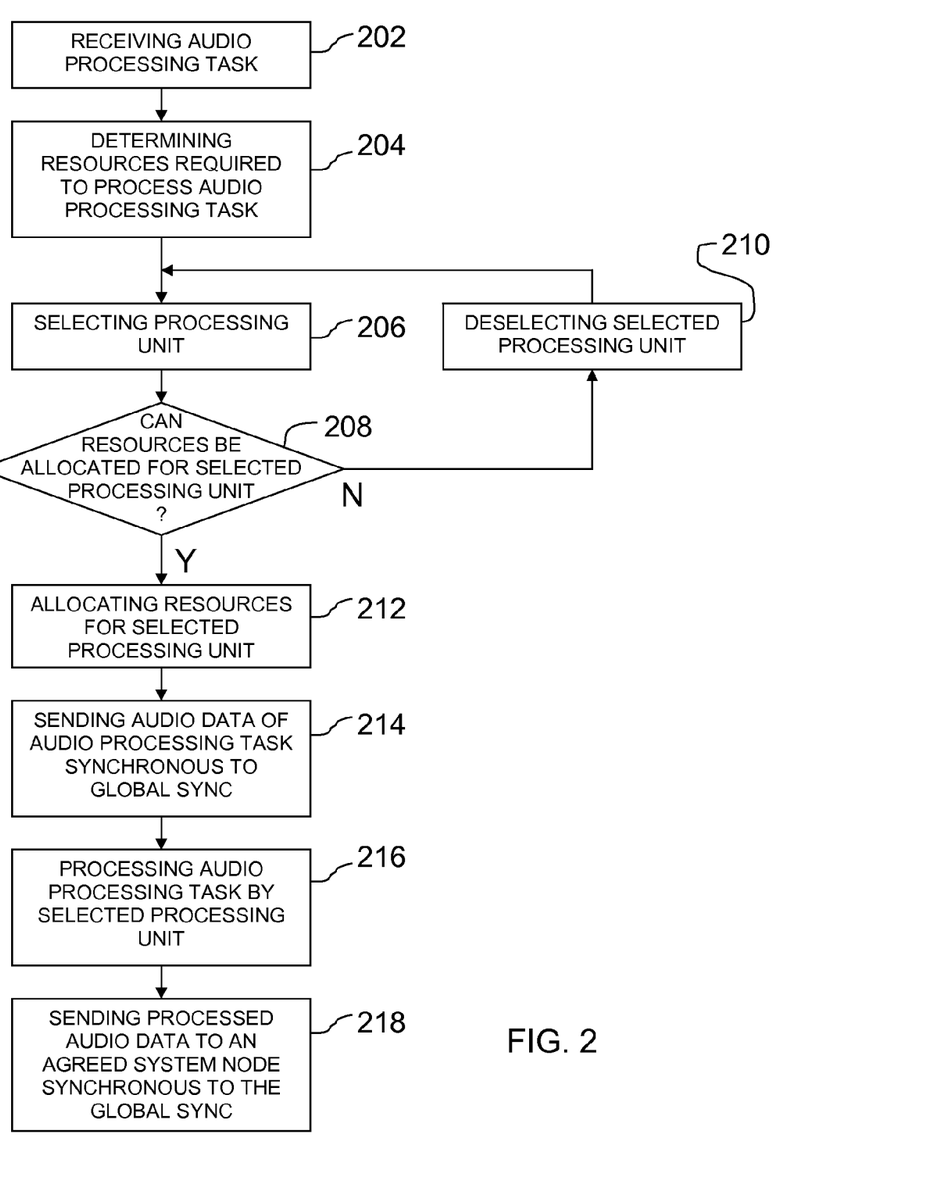
FIG. 2 presents a flow chart of a method of distributed audio processing according to one embodiment, FIG. 3 schematically shows a portable electronic communication device according to one embodiment FIG. 4 displays a portable electronic communication device in the form of a cellular phone, according to one embodiment, an FIG. 5 illustrates a computer program product, having thereon computer program code means.

FIG. 2 is a flow chart of a method of distributed audio processing according to one embodiment. In describing FIG.

Figure 3:
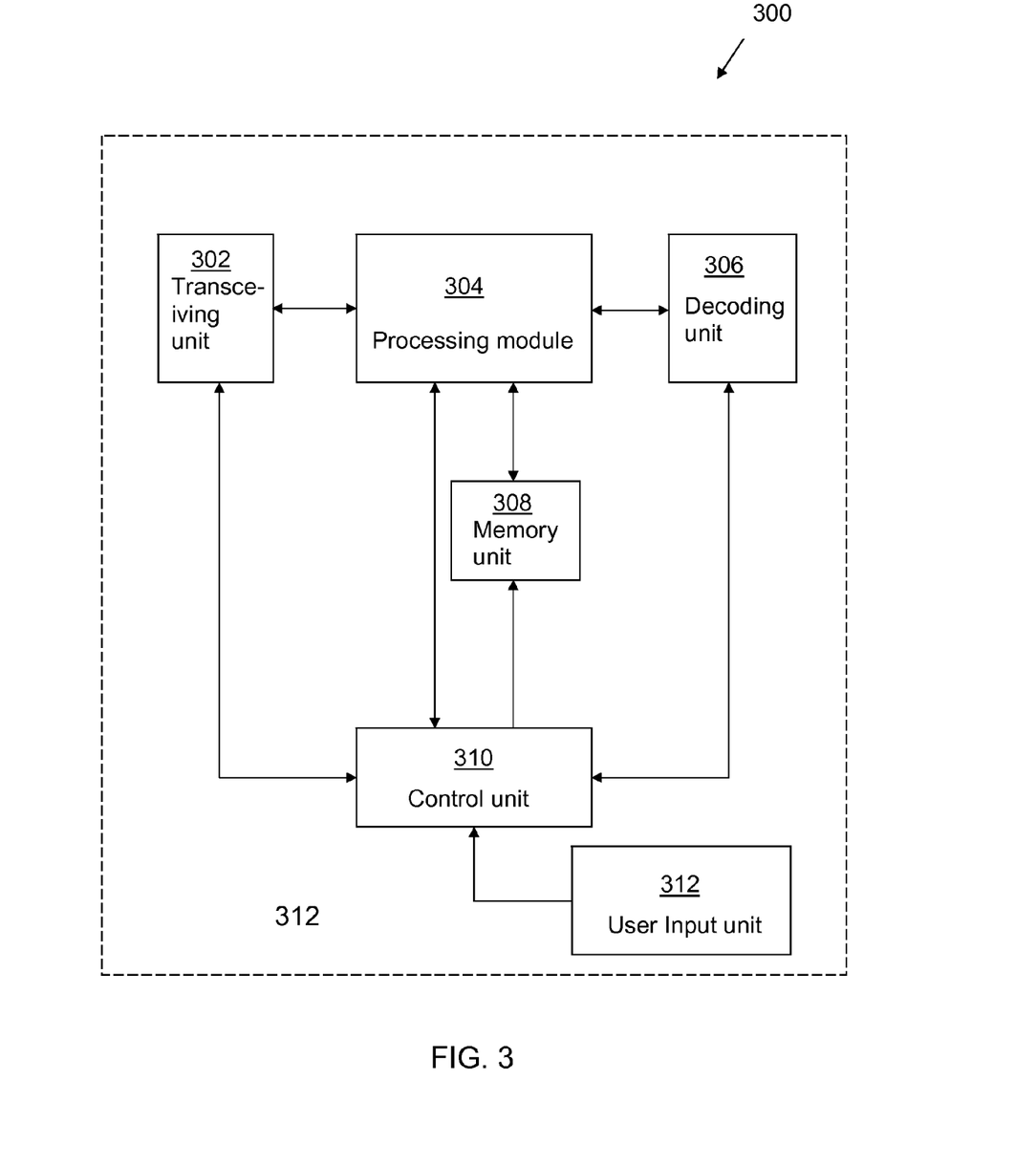

2, reference will also be made to FIG. 3, which schematically illustrates a portable electronic communication device according to one embodiment FIG. 3 illustrates a transceiving unit 302 arranged to receive/transmit radio frequency modulated data and connected to an audio processing module 304. The transceiving unit 302 is arranged to extract a synchronization pulse from the radio network which is described further below.

The audio processing unit 304 is moreover connected to an audio encoding and decoding unit 306, which unit typically comprises, for example, digital to analog converters (DAC), analog to digital converters (ADC), filters, amplifiers, microphones, input and output connectors, etc.

Processing module 304 may also be connected to a module external memory unit 308.

The transceiving unit 302, the processing module 304, the audio encoding and decoding unit 306 as well as the memory unit 308 may be connected to a control unit 310. A user input unit 312 may be arranged to forward user input and may also be connected to control unit 310.

The processing module 304 may also comprise internal memory units (not shown).

The method of FIG. 2 may start by receiving an audio processing task by a processing unit in the form of an audio file, in act 202. In this embodiment the processing unit may be the application central processing unit (CPU). This act is performed by the processing module 304, possibly under control of the control unit 310.

The synchronization pulse may be provided by the control unit 310 to the processing module 304. Irrespective of where the synchronization pulse is obtained it may be provided under control of the control unit 310. According to an alternative embodiment, the processing unit may be another processing unit such as an application digital signal processing unit (DSP).

At the stage when an audio file, as one example of the audio processing task, has been received by a processing unit, such as the application CPU, the determination of the resources which are required to process the audio processing task may be performed in act 204. This may be performed by the application CPU according to one embodiment. The available resources may be specified in terms of processing capacity in, for example, million instructions per second (MIPS).

After having performed the step of determining which resources are required to process the audio processing task in step 204, the act of selecting processing unit, step 206, may be performed. This act may be performed in dependence on a processing scheduling. One example of processing scheduling may be to make use of a priority list that includes at least some of the processing units available.

For instance, in order to process the audio task, a certain processing unit may be preferable due to processing capacity, or due to other preferable parameter values. Another processing unit may for instance be the second most preferable processing unit for the same reason or for other reasons.

Other reasons with which the processing unit may be graded can be electric power consumption considerations such as current consumption. Yet other reasons on which the selection of processing unit may be based on the location of the selectable processing unit in relation to the audio codec, containing the hardware analog/digital, digital/analog converters, and possibly other encoders and decoders.

Having selected a processing unit in act 206, the act of determining whether sufficient resources can be allocated by the selected processing unit, or not, in act 208 follows. It is thus determined in this step whether the selected processing unit can allocate sufficient resources to perform the processing task, or not.

As one example of whether the selected processing unit can allocate sufficient resources to perform the processing task, consider the situation in which the selected processing unit can allocate 77 MIPS. If the task requires 77 MIPS or less, such as, for example, playing an already decoded mp3 file, the selected processing unit may be allocated.

In order to be able to consume an mp3 file, the mp3 file first is decoded, which typically is one processing task in itself. Thereafter the playing of the decoded file can be another processing task. Audio data that is to be perceived by a user may be further post processed by equalizing methods, by using peak limiting means, by using soft clipping such as to avoid over-loading, or by adapting the audio data to the loudspeaker being used or to the head set, to mention a few post processing methods. Each one of these post processing steps may be one processing task on its own.

The order in which these processing tasks can be processed is dependent on the user case, that is, by the input of the user.

If it is determined that the selected processing unit, for instance, the preferred processing unit, can not allocate resources enough to process the audio processing task in act 208, that is the answer of the question in step 208 is N, the next act of the method of distributed audio processing is the step of deselecting selected processing unit in act 210. In this act, the processing unit that was selected in act 206 is thus deselected. After having deselected the processing unit in act 210, act 206 is revisited according to the flow-chart of FIG. 2. By returning to step 206 a new processing unit may thus be selected.

By first selecting a processing unit and determining whether the selected processing unit can process the processing task or not, a method is provided to ensure that the selected processing unit which is not deselected, can allocate resources for the processing task.

As described above, the selection of a processing unit may be based on a processing scheduling. One example of a processing scheduling is the so called "round robin" scheduling. In round robin scheduling, the processing units are virtually connected to each other to form a closed loop. When any one of the processing units therein is found not to be able to allocate sufficient resources when being requested, another processing unit is selected by selecting a processing unit situated nearby the one being unable to allocate the resources. By selecting nearby situated processing units along the loop, the selecting process may comprise one entire turn or even more, in case none of the temporarily selected processing units are able to allocate sufficient resources to process the audio processing task in point. In this situation, congestion may occur, resulting in a delay of the audio data to be processed.

According to an alternative exemplary embodiment, the processing scheduling may be a random processing scheduling, that is, randomly selecting a processing unit among the processing units being available.

According to yet another embodiment, the processing scheduling may avoid selecting a certain processing unit for a first audio processing task, for the reason that this very processing unit is the preferred processing unit for another processing task that is likely to be received within a short time span of, for instance, a few milliseconds.

According to still yet another embodiment, the time duration until an inquired processor can start to process the audio file is determined. If there are no processing units idle, all processing units can be inquired about when the processor can start processing at earliest. Having the earliest time available for all of at least most processing units, it can be determined which processing unit can first start processing the processing task. This processing unit is thus selected for the audio processing task.

By determining whether a selected processing unit can allocate resources to process the processing task in act 208, loading processing units with processing tasks which cannot allocate resources is thus avoided. Therefore, resources may preserved for other processing tasks.

Also during the processing of a processing task requiring resources, the processing task may be moved from a first processing unit to a second processing task, and thereby off-loading resources of the first processing task. This may, for instance, be performed if it is determined that a second processing task is given higher priority to the first processing task than the first processing task. By allocating resources dynamically distributed processing can be performed. Moreover, by performing the processing of processing tasks synchronous to a global synchronization pulse, the relative phase of a processed audio stream or audio data will remain unchanged, since the affected audio streams or data are progressed in the same rate, according to the synchronization pulse.

It is important to notice that the synchronization of audio streams or data in the sense of that the relative phase of the streams or data remains unchanged or at least essentially unchanged is a prerequisite to processing of ongoing real time audio streams that are consumed by a user, since changes in phase will be perceived by the consumer.

After act 208, resources may be allocated to the selected processing unit in act 212. This allocation of resources can be performed over the inter-CPU communication bus.

According to this embodiment, audio data of the audio processing task synchronous to a global synchronization pulse may be sent to the selected processing unit, in act 214.

Acts 202 to 212 may be performed by the processing module 304 under control of the control unit 310. Act 214 may be performed by the processing module 304 in dependence of the synchronization pulse as received by the transceiving unit 302.

Act 214 is thus dependent on the synchronization pulse. As previously mentioned, the synchronization pulse may be extracted from a radio signal, such as one with a synchronization frequency of 48 kHz. The synchronization pulses are used as a clock to keep the relative phase of two or more signals being processed unchanged. In alternate implementations, the frequency of the synchronization pulse may however be different from 48 kHz, for instance 96 kHz or 24 kHz.

The sample rate of the digital audio data to be processed may be adjusted to be a multiple of the synchronization pulse. For instance, the sample rate may be 48 kHz and the synchronization pulse frequency may be 96 kHz.

In case a first audio data signal is to be processed in relation to a second audio data signal, and the sample rates are not equal, sample rate conversion is needed of one or both of the audio signals such that processing the relative phase of the two signals unchanged is enabled.

By letting signals progress according to the global synchronization pulse, signals may be processed individually without losing the relative order. For instance, in case two signal streams are to be mixed and one of them is pre-processed and the other is not, the relative phase can be maintained by executing steps following the synchronization pulse.

The effect of the synchronization phase will further be exemplified below.

After the processing unit has received the audio data the act of processing the processing task by the selected processing unit is performed in act 216. This act may typically be performed by the processing module 304 of the portable electronic communication device 300.

Having processed the processing task by the selected processing unit in act 216, the act of sending the processed audio data to an agreed system node synchronous to the global synchronization pulse is thereafter performed in act 218. This act is thus also performed in dependence on the synchronization pulse as received by the transceiving unit 302 and provided to the processing module 304, where act 218 may be performed. The agreed system node may be another processing unit such as an application DSP or a CPU unit. Moreover, the system node may also be the audio codec comprising the DAC, ADC, filters, amplifiers etc.

In the situation in which the audio data or the audio stream has been processed such that the data and stream are ready to be presented to a user, another act (not shown in FIG. 2) of presenting the processed data be performed. Presenting audio data or audio streams may, as one example, be made via an audio codec using a loudspeaker function.

Processing tasks may be sent by any one of the processing units to another processing units in order to determine a processing unit that can allocate resources to process the processing task.

For example audio data can originate from the auxiliary input (AUXIN) of the audio codec and sent to an application DSP over the multi channel audio bus to be processed. The audio data may, for instance, be sent to the Base band DSP and further to the radio unit for transmitting the audio data received by the AUXIN possibly in relation to another audio data or another audio stream.

A large variety of different audio cases may occur in which each may comprise several audio processing steps. Since the present description provides distributed processing synchronous to a global synchronization pulse the relative phase of the processed audio streams remains unchanged. This offers advantages and possibilities such as on-line mixing and online manipulation of an audio stream that is being consumed by a user, without delaying the consumed stream.

Performing processing steps of audio data such as sample rate conversion of an audio file, mixing of a first audio stream and a second audio stream, equalizing of an audio steam, decoding or encoding of audio data, echo cancellation and noise suppression, in most cases can not be performed in an arbitrary order. Dependent on the input information by a user via the user input unit 312 the portable electronic communication device may determine which audio data files and which audio streams are to be processed, as well as in which order the processing tasks have to be processed. In order to be able to process the required processing tasks in the correct order, distributed processing is utilized together with the dynamic allocation of resources of the selected processing unit.

Figure 4:
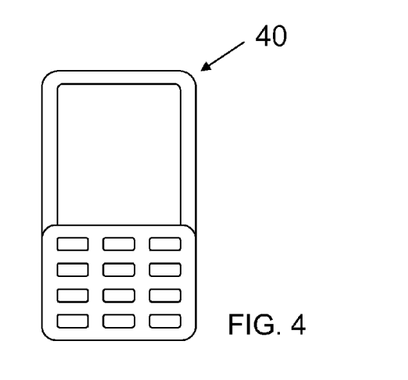

FIG. 4 displays a portable electronic communication device 40 in the form of a mobile phone, according to one embodiment.

Figure 5:
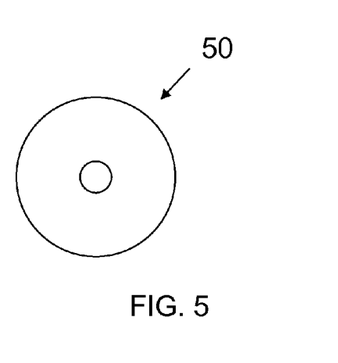

FIG. 5 schematically depicts a computer program product 50 according to one embodiment, having thereon computer program code means. When the computer program code means, comprised on the computer program product, is loaded in a computer or portable electronic communication device, the computer or portable electronic communication device may process or perform the audio processing tasks described above.

The computer program product may be provided as a CD-ROM disc according to one embodiment. However, the computer program product 50 can alternatively be provided as another type of disc such as a DVD disc, a hard disc, or be provided as a memory or other storage capacity, such as a flash-based memory, for example a memory stick or a USB (Universal Serial Bus) memory or even a memory of the type being volatile.

A number of advantages are provided using the techniques described above. For example, by sharing audio components, production costs may be reduced by sharing an audio subsystem with multiple processing units. Additionally, improved processing performance can be achieved by the selection of processors optimized for certain audio processing tasks. Moreover, an improved electric power management efficiency can be obtained due to the possibility of selecting processing units having a suitable current consumption with respect to available battery power.

Since centralization of resources enables certain DSPs to be shut down when the number of processing task is low, that is when the processing load is low, battery power can be saved, which is clearly beneficial.

Additionally, flexibility is provided to select a processing unit able to process the audio task. For peripheral units connected to portable electronic communication devices, the accessibility is increased since the processing unit to process the audio data may be selected among a larger number of processing units, as compared with the case having a specific audio processing unit. It is also an advantage that the capacity to process simultaneous tasks increases by using a larger number of processing units applying dynamic allocation of resources. Accordingly, congestion can be avoided for processing tasks that have a high priority, since other processing units may be selected for other processing tasks or alternatively the prioritized processing task can be moved to another processing unit which for certain can allocate resources for processing of the processing task. This is not a merit of using several processing units only but of using dynamic allocation of resources in connection with using several processing units.

It is emphasized that the concepts described herein can be varied in many ways, of which the alternative embodiments above and below only are a few examples. These different embodiments are hence non-limiting examples. The scope is only limited by the subsequently following claims.

According to one embodiment, an audio codec may comprise analog units to enable processing of processing tasks which may not easily be processed digitally, at a certain stage or phase of processing of audio signals.

What is claimed:

1. A method of dynamically allocating processing in a mobile phone having a plurality of processing units, the method comprising:
    receiving an instruction to process an audio processing task related to audio data;
    determining whether resources for processing the processing task are available at a first processing unit of the plurality of processing units in the mobile phone;
    performing the audio processing task by the first processing unit when the resources are determined to be available, the audio processing task obtaining processed audio data; and
    providing the processed audio data synchronously with a global synchronization pulse so that the phase of the audio data is controlled.

2. The method according to claim 1, where receiving an instruction includes receiving an instruction to process an audio processing task related to a first audio stream, and where providing the processed audio data includes providing a processed version of the first audio stream synchronously to the global synchronization pulse so that the phase of the first audio stream is controlled.

3. The method according to claim 2, where performing the audio processing task includes processing the first audio stream in relation to a second audio stream, and where providing the processed audio data includes providing the result of the processed first audio stream in relation to the second audio stream synchronously with the global synchronization pulse so that the relative phase of the first and second audio streams is unchanged.

4. The method according to claim 1, where the determination of whether resources to process the processing task are available is preceded by selecting the first processing unit.

5. The method according to claim 1, further comprising:
    requesting the first processing unit to process the audio processing task.

6. The method according to claim 1, where performing the audio processing task by the first processing unit includes allocating resources for processing the processing task at the first processing unit.

7. The method according to claim 1, further comprising performing the processing task by another one of the plurality of processing units if the first processing unit can not allocate resources to process the audio processing task.

8. The method according to claim 7, where the performing the processing task by another one of the plurality of processing units is preceded by determining whether the another one of the plurality of processing units has available resources for processing the processing task.

9. The method according to claim 8, where the another one of the plurality of processing units is selected for determining whether the another one of the plurality of processing units has available resources based on a schedule.

10. The method according to claim 9, further comprising requesting the another one of the plurality of processing units to process the audio processing task.

11. The method according to claim 10, where performing the processing task by another one of the plurality of processing units is performed in dependence of the resources that can be allocated.

12. The method according to claim 1, further comprising:
    selecting the first processing unit of the plurality of processing units according to a predetermined schedule.

13. The method according to claim 1, where the predetermined schedule includes a priority list according to which the processing unit is selected.

14. A mobile phone for dynamically allocating resources, comprising:
    a first processing unit;
    at least one other processing unit;
    an inter-processing unit communication bus to couple the first processing unit and the at least one other processing unit in the mobile phone;
    a multi-channel audio bus for carrying audio data between the first and the at least one other processing unit; and
    a control unit for providing a global synchronization pulse to at least the first processing unit, determining, over the inter-processing unit communication bus, whether resources to process a processing task are available at the first processing unit, controlling performance of the audio processing task by the first processing unit when the resources are determined to be available, and controlling providing processed audio data synchronously with the global synchronization pulse to control the phase of the audio data.

15. A computer program product comprising a computer readable medium having computer readable code thereon, the computer readable code, when loaded in a mobile phone, causing the mobile phone to:
   receive an instruction to process an audio processing task related to audio data;
   determine whether resources for processing the processing task are available at a first processing unit of the plurality of processing units in the mobile phone;
   perform the audio processing task by the first processing unit when the resources are determined to be available, the audio processing task obtaining processed audio data; and
   provide the processed audio data synchronously with a global synchronization pulse so that the phase of the audio data is controlled.

* * * * *